US006687497B1

(12) United States Patent
Parvulescu et al.

(10) Patent No.: US 6,687,497 B1
(45) Date of Patent: Feb. 3, 2004

(54) METHOD, SYSTEM, AND STRUCTURE FOR DISABLING A COMMUNICATION DEVICE DURING THE OCCURRENCE OF ONE OR MORE PREDETERMINED CONDITIONS

(75) Inventors: Adrian Parvulescu, Rivervale, NJ (US); Robert P. Ellis, Warwick, NY (US)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 0 days.

(21) Appl. No.: 09/502,650

(22) Filed: Feb. 11, 2000

(51) Int. Cl.[7] ............................................. H04M 11/10
(52) U.S. Cl. .................. 455/420; 455/404.1; 455/418; 455/414.1; 379/39; 340/426
(58) Field of Search ............................ 455/418, 419, 455/420, 414, 409; 379/39.45; 340/426; 307/10.2, 10.3

(56) References Cited

U.S. PATENT DOCUMENTS

| 4,297,539 | A | * | 10/1981 | Fairbanks .................. 379/445 |
| 5,146,407 | A |   | 9/1992  | Motohashi |
| 5,191,312 | A |   | 3/1993  | Altmann et al. |
| 5,515,364 | A | * | 5/1996  | Fague ........................ 370/278 |
| 5,541,572 | A |   | 7/1996  | Okamoto et al. |
| 5,548,800 | A |   | 8/1996  | Olds et al. |
| 5,749,052 | A |   | 5/1998  | Hidem et al. |
| 5,815,407 | A |   | 9/1998  | Huffman et al. |
| 5,864,757 | A | * | 1/1999  | Parker ........................ 340/5.54 |
| 5,887,258 | A |   | 3/1999  | Lemozit et al. |
| 6,222,458 | B1 | * | 4/2001  | Harris ......................... 340/3.5 |
| 6,262,657 | B1 | * | 7/2001  | Okuda et al. ................ 340/438 |
| 6,298,131 | B1 | * | 10/2001 | Veschi .................... 379/355.01 |
| 2001/0050614 | A1 | * | 12/2001 | Yang .......................... 340/540 |
| 2002/0039896 | A1 | * | 4/2002  | Brown ........................ 455/419 |
| 2002/0049069 | A1 | * | 4/2002  | Johnson ....................... 455/528 |
| 2002/0065112 | A1 | * | 5/2002  | Endoh et al. ................ 455/567 |

FOREIGN PATENT DOCUMENTS

| GB | 2362020 A | * | 11/2001 | ........... G09F/21/04 |
| JP | 11004190 A | * | 1/1999  | ........... H04B/7/26 |
| KR | 2001097024 A | * | 11/2001 | ........... H04B/1/38 |

* cited by examiner

*Primary Examiner*—William Trost
*Assistant Examiner*—Marcos L Torres
(74) *Attorney, Agent, or Firm*—Miller Patent Services; Jerry A. Miller

(57) ABSTRACT

A small transmitter built into the electric system of an environment, either stationary or potentially mobile, transmits a weak RF field capable of at least partially disabling a communication device in response to receiving a trigger signal. The trigger signal is generated by the electric system in response to the presence of one or more so-called "forbidden" conditions that require that the communication device be disabled. Disabling the communication device in this manner prevents the user from using the communication device under inappropriate conditions and thereby operates to greatly enhance public safety. Disabling the communication interface of the communication device may entail disabling all keypad functions of a cellular phone, for instance, disabling all but valid, predetermined emergency uses of the communication interface, or powering-down the communication device during the existence of the condition.

8 Claims, 9 Drawing Sheets

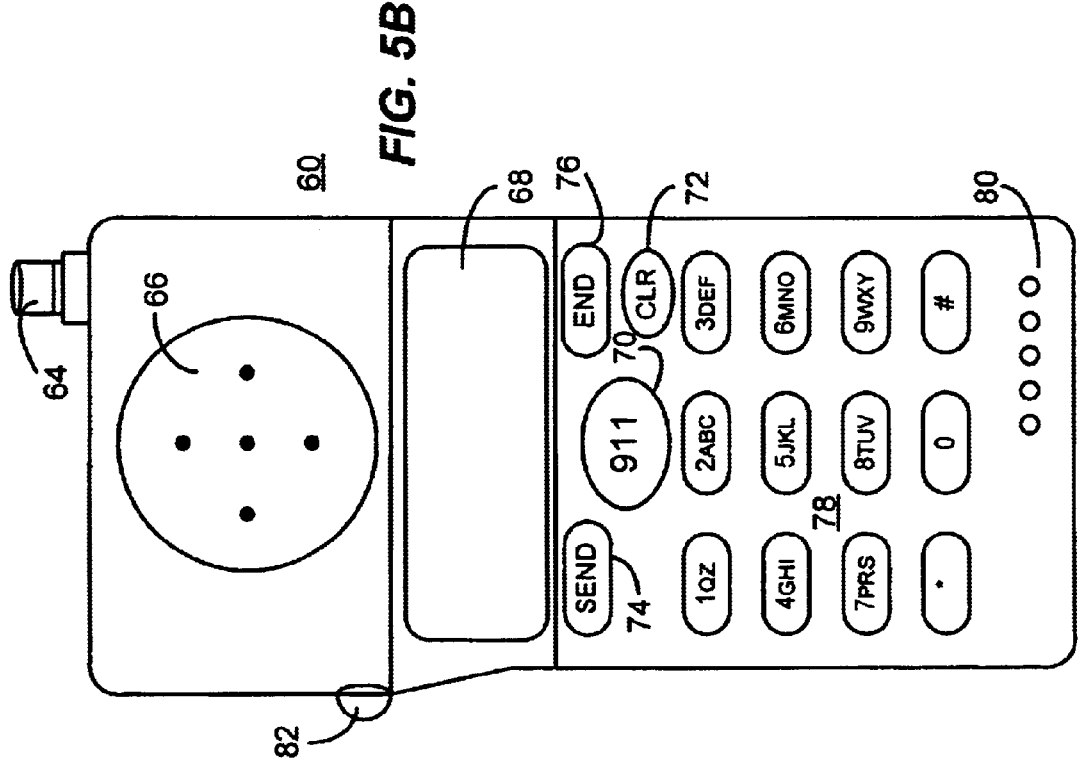
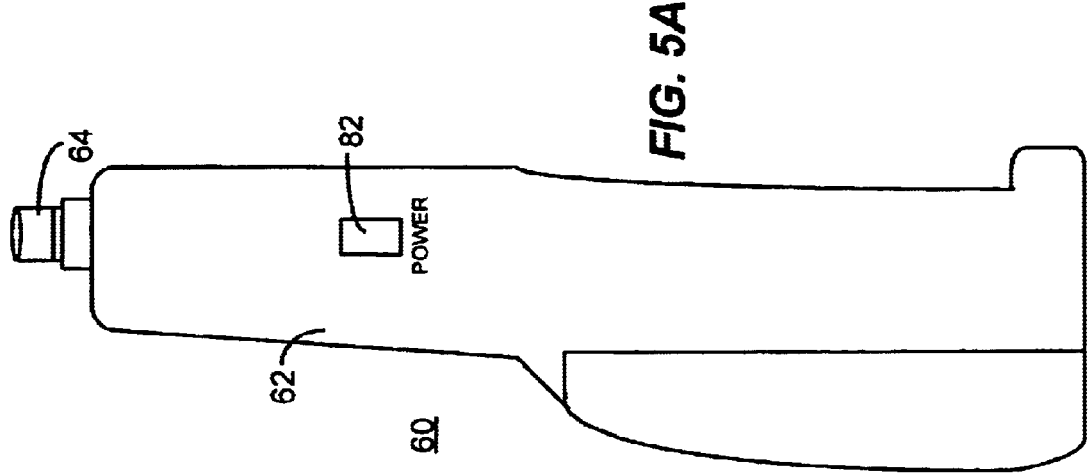

POWER DOWN COMMUNICATION DEVICE — 140

DISABLE THE NON-EMERGENCY PORTION(S) OF THE COMMUNICATION INTERFACE OF THE COMMUNICATION DEVICE — 142

144 — DISABLE THE NON-EMERGENCY PORTION OF THE COMMUNICATION INTERFACE OF THE COMMUNICATION DEVICE AND ENABLE THE EMERGENCY PORTION OF THE COMMUNICATION INTERFACE

146 — EMERGENCY PORTION OF COMMUNICATION INTERFACE PROGRAMMED?

NO → POWER-DOWN COMMUNICATION DEVICE — 148

YES → DISABLE NON-EMERGENCY PORTION OF COMMUNICATION INTERFACE AND ENABLE EMERGENCY PORTION OF COMMUNICATION INTERFACE — 150

METHOD, SYSTEM, AND STRUCTURE FOR DISABLING A COMMUNICATION DEVICE DURING THE OCCURRENCE OF ONE OR MORE PREDETERMINED CONDITIONS

FIELD OF THE INVENTION

This invention relates generally to communication technology, and more particularly to the selective disabling of communication devices in response to the presence of one or more predetermined conditions.

BACKGROUND OF THE INVENTION

Personal communication devices have become widely popular in the recent past. This burgeoning popularity may be attributed to improved coverage and service as well as declining costs. The proliferation of communication devices, particularly cellular telephones, however, has had an undeniably negative effect on public safety. Perhaps the most pernicious aspect of increased cellular telephone usage has been the attendant increase in motor vehicle accidents, attributable in large part to drivers using cellular telephones while driving. It is widely known and accepted that using the cellular telephone while driving presents a significant distraction to the driver. Manual dialing of a cellular telephone is, in particular, believed to significantly degrade the driver's ability to control the vehicle, be adequately aware of the ever-changing driving environment, and to exercise sufficient judgment. In fact, in recognition of the significant threat to public safety posed by inappropriate cellular telephone usage while driving, most states in the United States are considering legislation that would limit operation of a cellular telephone while driving to emergency situations only.

SUMMARY OF THE INVENTION

It is accordingly an object of the invention to enhance public safety by encouraging the appropriate use of cellular telephones and other communication devices. In particular, the use of communication devices while driving or in other environment-inappropriate situations is to be discouraged.

According to the present invention, a methodology, system, and structure which provide for selectively disabling a communication device, such as a cellular telephone, when the presence of one or more forbidden conditions is detected in an environment in which the communication device is located. According to the methodology of the present invention, a trigger signal indicative of the presence of a condition for which the communication device should be disabled is generated. The trigger signal is received by an RF transmitter, thereby causing the RF transmitter to generate a weak RF field in response. Further, according to the methodology, a communication device receiving the weak RF field is disabled as a result of receiving the weak RF field. Disabling the communication device can mean powering-down the communication device, disabling the communication interface, such as a keypad, of the communication device, and disabling all but valid, programmed emergency uses of the communication interface during the existence of one or more forbidden conditions. In the case of a mobile vehicular environment, a forbidden condition may be the movement of the vehicle in which the RF transmitter is placed.

According to a further aspect of the present invention, a communication system comprises an environment, either stationary or potentially mobile, and a communication device. The environment has an RF transmitter and an electric system capable of generating a trigger signal representative of the presence of one or more forbidden conditions that require the disablement of the communication device. The communication device is located within the environment and has a control element and a communication interface. When the presence of one or more forbidden conditions is detected, the electric system generates the trigger signal. The trigger signal causes the RF transmitter to transmit a weak RF signal and field. When the communication device detects the weak RF field, the control function generates a control signal that disables the communication device. In the event that the environment is a potentially mobile vehicle, the communication device is located within a passenger compartment of the vehicle and the trigger signal generated by the electric system may be representative of the vehicle speed when the vehicle is in motion. The electric system generates the trigger signal when the vehicle has reached a predetermined value of speed.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

FIGS. 5A and 5B illustrate a side view and a front view, respectively, of a cellular telephone, according to the present invention;

FIGS. 10–13 represent alternate methods of disabling a communication device, according to various aspects of the present invention.

DESCRIPTION OF THE INVENTION

Figure 1:
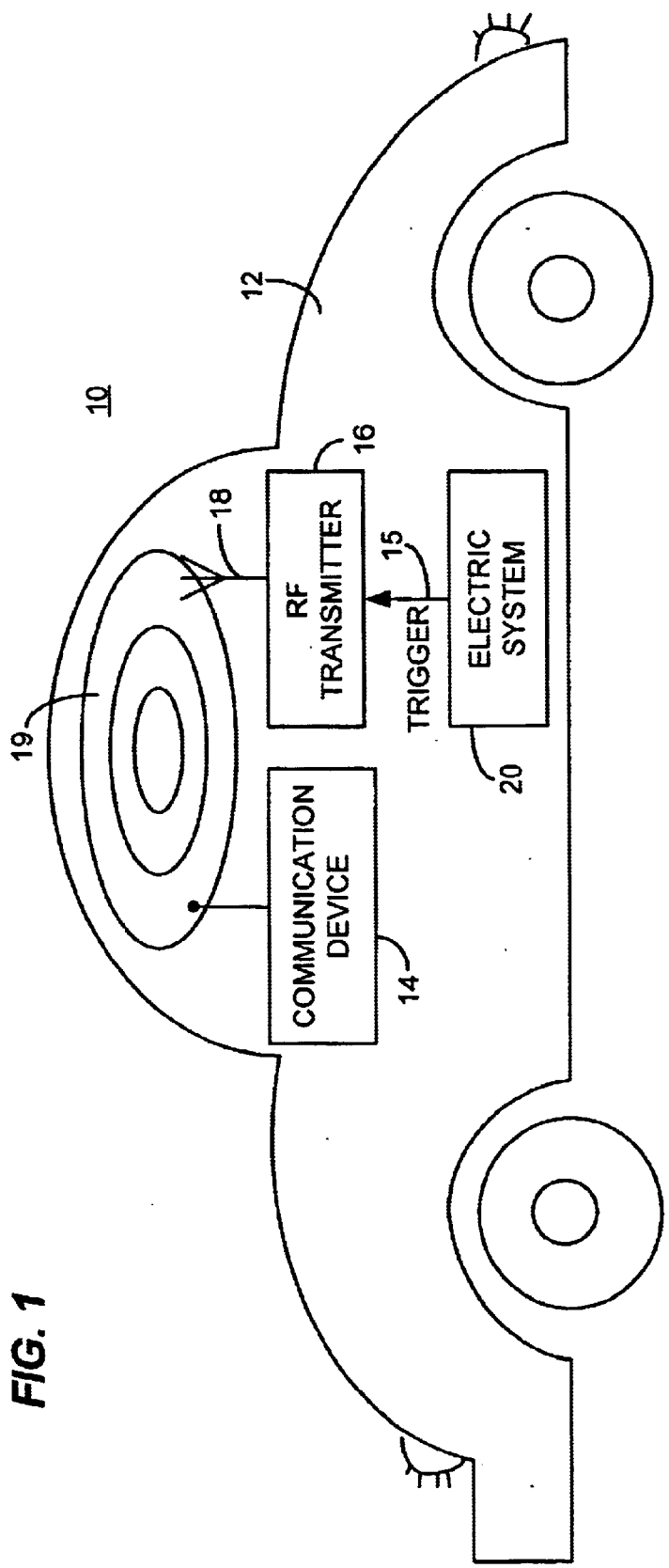
FIG. 1 illustrates a communication system, according to the present invention.

A small transmitter built into the electric system of an environment, either stationary or potentially mobile, transmits a weak RF field capable of at least partially disabling a communication device in response to receiving a trigger signal. The trigger signal is generated by the electric system in response to the presence of one or more so-called "forbidden" conditions that require that the communication device be disabled. Disabling the communication device in this manner prevents the user from using the communication device under inappropriate conditions and thereby operates to greatly enhance public safety. Disabling the communication interface of the communication device may entail disabling all keypad functions of a cellular phone, for instance, disabling all but valid, predetermined emergency uses of the communication interface, or powering-down the communication device during the existence of the condition. Potentially mobile environments include vehicles such as automobiles, busses, airplanes, trains, etc. while a stationary environment could be a hospital or a secure facility. If the communication device is a cellular telephone, disabling the non-emergency uses of the communication interface will not disable the cellular telephone transmitter itself, thereby allowing the cellular telephone to continually register with cells sites if it is mobile.

According to a preferred embodiment of the present invention, the communication device is a cellular telephone located in a vehicular environment. The transmitter is an RF transmitter embedded in the vehicle that will generate a weak RF field to disable the cellular telephone if the vehicle is in motion or upon the occurrence of other forbidden conditions, such as excessive noise in the vehicle. The cellular telephone is disabled while the vehicle is in motion to prevent a would-be user of the cellular telephone from placing non-emergency telephone calls. This restriction greatly reduces or even prevents the occurrence of inherently dangerous driving situations. The present invention does not, however, preclude the placement of telephone calls in an emergency situation so long as the cellular telephone has not been powered-down. Unless disabling the cellular telephone means powering it down, a portion of the communication interface dedicated to placing an emergency call, such as a predetermined, programmed speed-dial function to "911" or other appropriate emergency service, remains unaffected by the movement of the vehicle. The telephone user may program the telephone speed-dial function with the appropriate "911" or other emergency number at the initial cellular phone setup. The programmed emergency number may be fixed or it may programmable, as allowed by the telephone manufacturer or service provider. In this manner, the present inventions prevents usage of the cellular telephone while the car in is motion for all but emergency situations and thus greatly contributes to the safe usage of cellular telephones. It should be noted that it is anticipated that the programmed emergency keys of the communication interface, whether part of the communication device itself or simply within the environment, are accessible and usable by a user at any time that the communication device is powered up, and not just when the non-emergency portions of the interface have been disabled.

In accordance with this embodiment, system 10 of FIG. 1 illustrates a small RF transmitter 16 located in an environment 12, either stationary or mobile, in which a communication device 14 is present-either now or at some future time. In this figure environment 12 is shown as an automobile vehicle. It is recognized, however, that other examples of mobile environments would include the vehicle as a bus, an airplane, an ambulance, etc; an example of a stationary environment would be a communications-free zone of a hospital or secure facility, for instance. The RF transmitter could be used on a bus to disable any communication device within close proximity of the bus driver in order to minimize communications, except emergency communications, that might be distracting to the driver. Or, an RF transmitter on an airplane could function to disable all communication devices that are capable of disrupting the airplane flight equipment during flight takeoff and landing. It is important to note that while the RF transmitter is shown located in the mobile environment of an automobile, the present invention also provides for placing the RF transmitter in a stationary environment with which a communications device might come into contact. Thus, for instance, the RF transmitter could be placed in a hospital environment, such as in the emergency room, to disable all cellular telephones or other communication devices as necessary.

Referring again to FIG. 1, electric system 20 of environment 12 provides a trigger signal 15 to RF transmitter 16 that causes RF transmitter 16 to generate a weak RF signal 18 and field 19. Trigger signal 15 is indicative of the presence of a condition for which the communication device should be disabled. Trigger signal 15, for instance, might be generated by electric system 20 when the vehicle is in motion thereby indicating that communication device 14 should be disabled while the vehicle is in motion. Or, RF transmitter 16 may be located in a stationary zone or environment, such as an emergency room of a hospital or a secure facility, in which all communication devices 14 are to be disabled; in this type of stationary environment, trigger signal 15 would be continuously generated by electric system 20. Weak RF signal 18 and weak RF field 19 are broadcast by the RF transmitter 16 in such a manner that the weak RF field 19 may be received by communication device 14 within the environment but not by a communication device outside the environment; in the case where environment 12 is a vehicle, weak RF field 19 is broadcast within the passenger compartment of the vehicle so that it may be received by a communication device 14 within the passenger compartment but not by a communication device outside the vehicle; the metal shielding of most vehicles will help contain RF field 19. RF field 19 is thus very weak but sufficient to cover the passenger compartment of the vehicle. In this manner, weak RF field 19 is strong enough to be received by communication device 14 but not so strong as to interfere with other, valid communications that might occur outside the passenger compartment of the vehicle. In the case where RF transmitter 14 is located in a bus, for instance, weak RF field 19 is generated in proximity to the bus driver and should be weak enough not to interfere with the cellular telephone conversations of bus passengers who are not located in close proximity to the driver.

Figure 2:
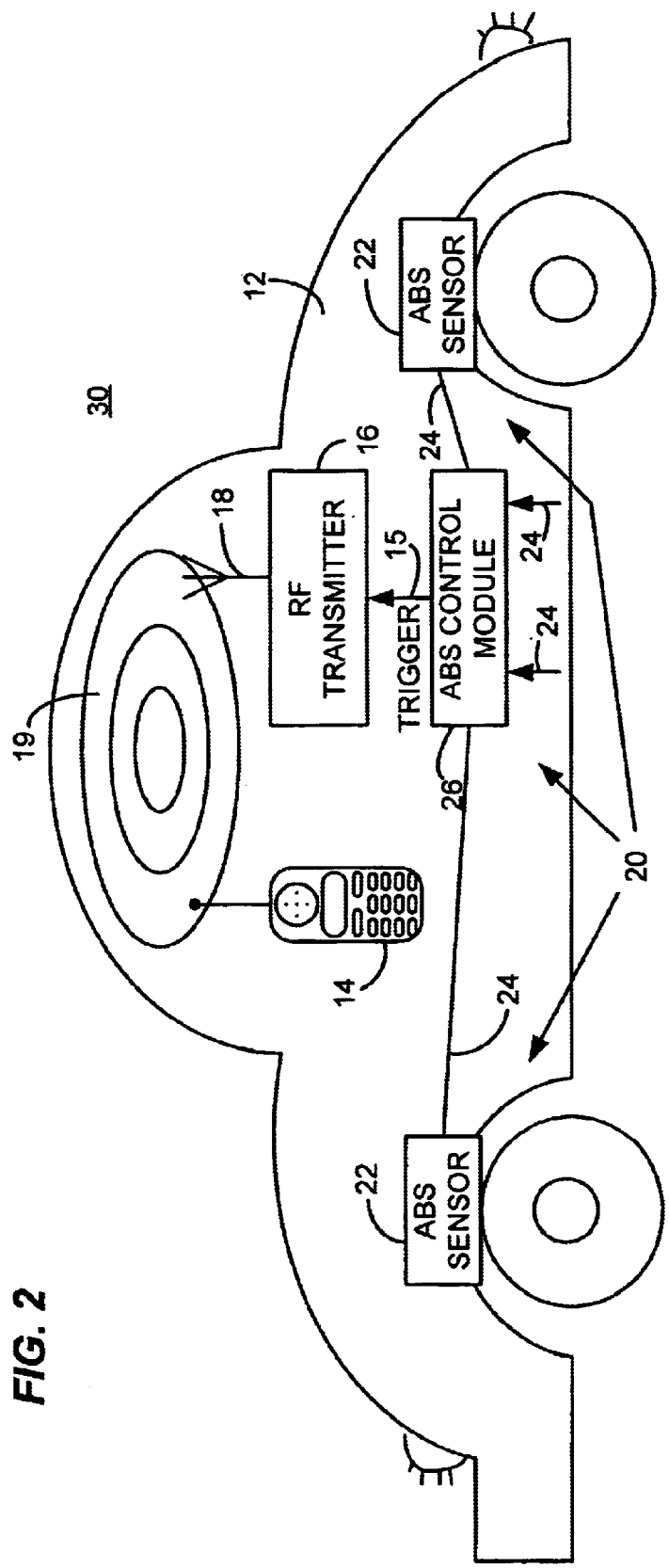
FIG. 2 illustrates an antilock brake system (ABS) as an electric system, according to an aspect of the present invention.

The electric system 20 that generates trigger signal 15 may be any number of appropriate systems of environment 12 that are capable of generating trigger signal 15 in response to the presence of a condition for which the communication device should be at least partially disabled. Referring now to system 30 of FIG. 2, electric system 20 is shown as an antilock brake system (ABS) of vehicle 12. In this example, the condition for which the trigger signal 15 will be generated is movement of vehicle 12, as measured by the movement of the wheels of the vehicle. Electric system 20 has four ABS sensors 22, one for each wheel of the vehicle 12, and ABS control module 26. ABS control module 26 receives an ABS sensor signal 24 from each of the ABS sensors 22. ABS sensors 22 monitor the movement of the wheels and generate ABS sensor signals 24 indicative of the movement of the wheels. ABS control module 26 generates trigger signal 15 when the ABS sensor signals 24 received by it indicate that the wheels of vehicle 12 are in motion. This trigger signal 15 is received by RF transmitter 16 and causes RF transmitter 16 to generate weak RF signal 18 and weak RF field 19 that will in turn at least partially disable communication device 14 within the vehicle. When the ABS sensor signals 24 indicate that the wheels of vehicle 12 are not in motion and thus the condition for which the communication device should be disabled is not present, electric system 20 will not generate trigger signal 15 and RF transmitter 16 will not be triggered to generate weak RF field 19, effectively disabling RF transmitter 16.

Figure 3:
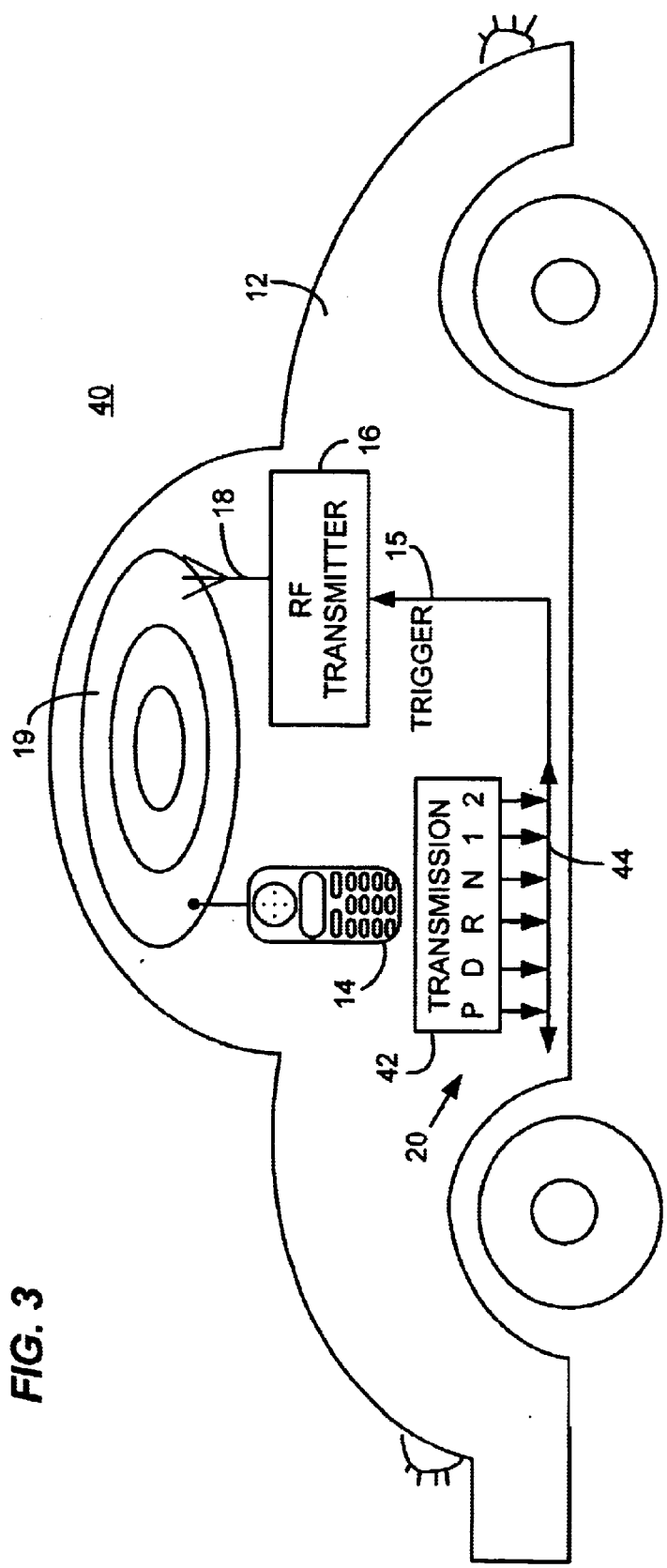
FIG. 3 illustrates transmission system as an electric system, according to an aspect of the present invention.

In addition to an ABS system, electric system 20 may be a transmission system of a vehicle, as illustrated in system 40 of FIG. 3. It can be seen that electric system 20 is a transmission system comprised of transmission control module 42 and transmission bus 44. Transmission control module 42 monitors the transmission position of the vehicle, whether it be a parked, drive, reverse, or neutral transmission position. It can be seen that each of the possible transmission positions (drive, reverse, neutral, drive1, drive2), with the exception of the parked transmission position, is connected to a transmission bus 44. The signal representative of the non-park transmission position at any given time is presented to transmission bus 44 which provides the signal as trigger signal 15. Trigger signal 15 operates as described above. It can be seen from this illustration that trigger signal 15 is only generated by transmission control module 42 when the vehicle is in a non-parked position. Any of the non-parked positions are representative of a condition for which the cellular telephone is not to be used, thereby prompting the generation of trigger signal 15 which will in turn cause RF transmitter 16 to generate the weak RF field 19 used for disabling communication device 14 while the vehicle is in motion or in neutral, a transmission position during which the vehicle 12 could move.

Figure 4:
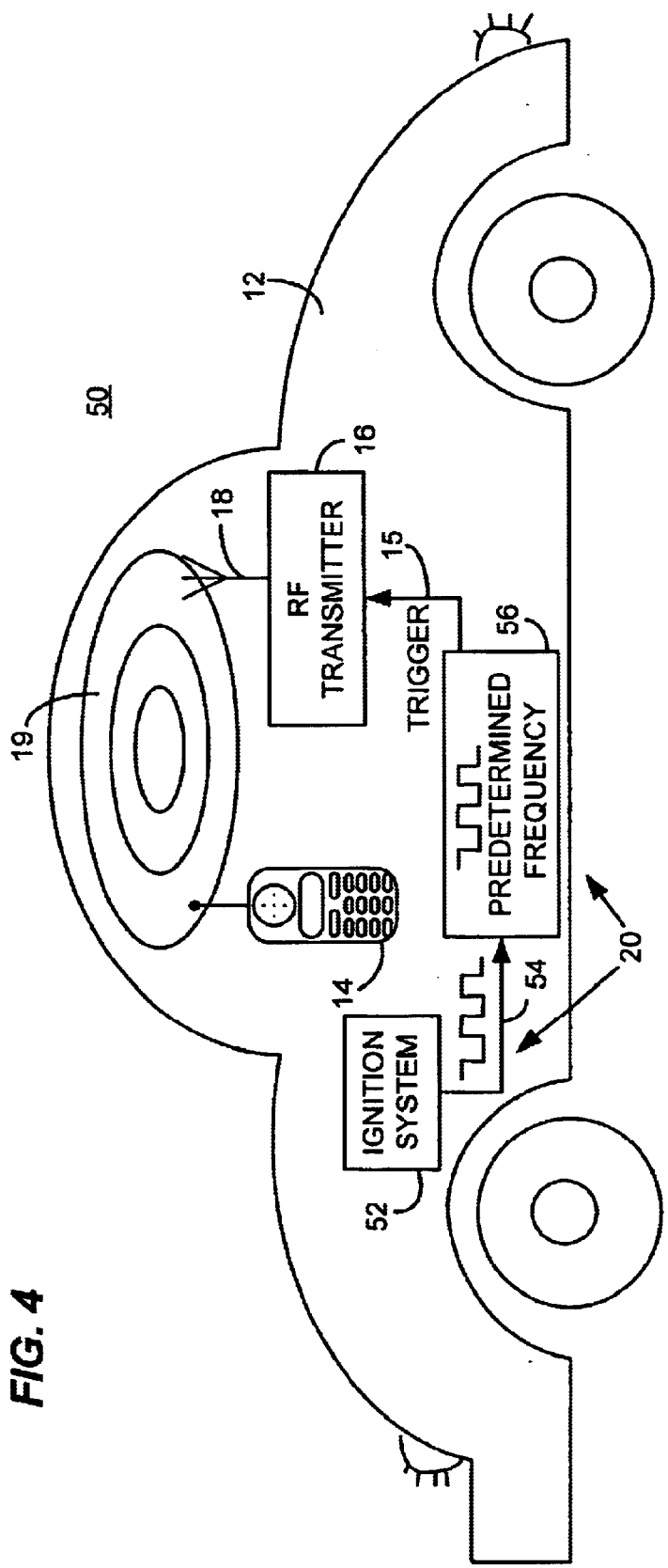
FIG. 4 illustrates an ignition system as an electric system, according to an aspect of the present invention.

Yet another example of an electric system 20 capable of generating trigger signal 15 is illustrated by system 50 of FIG. 4. In this figure, electric system 20 is an ignition system 52 that generates pulses 54 which are indicative of the speed of vehicle 12. These pulses 54 comprise the trigger signal 15 provided that the pulses 54 are above a predetermined frequency that is indicative of the vehicle 12 reaching or exceeding a predetermined speed. The frequency of the pulses 54 is monitored by frequency monitor element 56. When the frequency of the pulses 54, as measured by frequency monitor element 56, is above the predetermined frequency and thus indicative of the vehicle being in motion, frequency monitor element 56 passes through pulses 54 as trigger signal 15. Trigger signal 15 is received by RF transmitter 16 and causes RF transmitter 16 to generate the weak RF field 19 that will disable communication device 14. When pulses 54 have not reached the predetermined frequency indicative of vehicle motion, frequency monitor element 56 does not pass trigger signal 15 on to RF transmitter 16 and the communication device 14 will not be disabled.

In response to receiving the weak RF field 19 generated by RF transmitter 16, communication device 14 is disabled. As previously described, disabling the communication device can include any of the following options: disabling a communication interface of the communication device, such as by disabling all keypad functions of the device; disabling all but valid, predetermined emergency uses of the communication interface; or powering-down the communication device itself during the existence of the condition for which the communication device must be disabled. The means for disabling the communication device through these options will now be described. But first the workings of a preferred communication device, the cellular telephone, will be described.

Referring now to FIGS. 5A and 5B, a cellular telephone 60 as communications device is shown. FIG. 5A shows a side view of cellular telephone 60 while FIG. 5B shows a front view of cellular telephone 60. The cellular telephone 60 generally includes a housing 62, an antenna 64, a speaker 66, a display 68, a clear (CLR) key 72, a send (SEND) key 74, an end (END) key 76, a plurality of alphanumeric keys 78, a microphone 80, and a power key 82. Emergency (911) key 70 and its workings are unique to the present invention and will be described below.

Housing 62 is adapted to hold or retain all of the parts or elements of the cellular telephone 60 including antenna 64, speaker 66, display 68, microphone 80, and keys 70, 72, 74, 76, 78, and 82. Housing 62 may commonly be constructed of two or more portions made of a plastic type of material that are coupled together by fasteners, such as adhesive, screws, etc., known in the art. Antenna 64 is adapted to receive communications, such as the weak RF field 19 generated by RF transmitter 16. Antenna 64 may be retractable or a fixed length. Power key 82 is used to power on or off the cellular telephone 60. Speaker 66 and microphone 80 are adapted to operate in a well known manner.

Clear key 72, send key 74, end key 76, and alphanumeric keys 78 have functions known in the art. The clear key 72 commonly has one of two functions associated therewith. The first function of clear key 72 is to clear entered digits and characters that are displayed on display 68. This is accomplished by depressing clear key 72; depressing clear key 72 for a short time erases only the last digit or character entered while holding down clear key 72 will erase all entered digits and characters then displayed on display 68. The second function of clear key 72 is to return the cellular telephone 60 to a standby or conversation mode from other operations in which the cellular telephone 60 may be engaged; using the clear key 72 in this manner does not save any changes or selections previously made by the user. Send key 74 is used to initiate a telephone call by dialing a number selected by the user using DTMF tone signals when depressed. End key 76 is typically used to terminate a telephone call but may additionally be used to pause dialing, store paused numbers into memory, and link existing memory. Alphanumeric keys 78 are used to enter digits and alpha characters. Alpha characters and digits are entered by depressing the appropriate alphanumeric key 78 the required number of times, in the case of multiple function keys. Entering an "A," for instance, requires depressing the "2" key one time, entering a "B" requires depressing the "2" key two times, entering a "C" requires depressing the "2" key three times, and entering a "2" requires depressing this key four times, as known in the art. In the case of single function keys, such as the "*," "0,", and "#" keys, the user need only depress the desired key one time to enter the character or digit.

As previously discussed, receipt of the weak RF field 19 by the communication device, in this case cellular telephone 60, operates to disable the communication device. Disabling the communication device can refer to disabling all keypad functions of a communication interface of the communication device; disabling all but valid, predetermined emergency uses of the communication interface; or powering-down the communication device itself during the existence of the condition for which the communication device must be disabled. Referring back to FIG. 5B, disabling the communication device by powering-down the communication device itself during the existence of the unacceptable condition is akin to powering-down the device by activating the power button 82 to turn off the cellular telephone. However, de-activation of the cellular telephone 60 is accomplished internally to the cellular telephone 60 by a disable control signal that will be hereafter described; de-activation of the cellular telephone 60 occurs automatically with no intervention from the user of the cellular telephone required.

Disabling the communication device can further mean disabling all keypad functions of a communication interface of the communication device or disabling all but valid, predetermined emergency uses of the communication interface. In order to discuss these two meanings of disabling the communication device, it is necessary to describe what is meant by a communication interface of the communication device. Referring again to FIG. 5B in which the communication device is a cellular telephone, the communication interface of cellular telephone 60 may be considered to be any means by which the user of the cellular telephone can send information. Thus the user interface may be typically considered to be the keypad of the cellular telephone 60 and would include keys 70, 72, 74, 76 and alphanumeric keys 78.

When disabling the communication interface means disabling all keypad functions of the communication interface, upon receipt of the weak RF field 19 a control element of the cellular telephone 60 will generate a disable control signal that will operate to disable keys 70, 72, 74, 76, and alphanumeric keys 78. Since within this meaning of disabling the communication device emergency key 70 is unavailable to the user, the non-emergency portion of the user interface is the entire keypad and there is effectively no emergency portion of the user interface. In this instance, while the condition for which the communication device must be disabled is present, such as movement of a vehicle in which a cellular telephone 60 is located, the user will be unable to utilize the cellular telephone to engage in communications until the forbidden condition is no longer present. When the forbidden condition no longer exists, the weak RF field will no longer exist, the control element within the cellular telephone will no longer cause the disable control signal to be generated, and the communication interface will no longer be inaccessible to the user.

When disabling the communication interface of the communication device refers to disabling all but valid, predetermined emergency uses of the communication interface, upon receipt of the weak RF field 19 the control element of the cellular telephone 60 will generate a disable control signal that will operate to disable only those portions of the communication interface that have been defined as non-emergency portions. While the forbidden condition is present, the user will be unable to utilize the non-emergency portion(s) of the communication interface until a forbidden condition is no longer present but will be able to utilize the emergency portion(s) of the communication interface even during the presence of a forbidden condition. The emergency portion is unaffected by the presence of the weak RF field 19 so that the user of the cellular telephone is able to initiate an emergency communication even during the presence of a forbidden condition. Thus, if an emergency occurs while the vehicle is in motion the driver or other passenger of the vehicle will nonetheless be permitted limited, emergency use of the communication device in order to call for police, ambulance, or other emergency assistance.

Figure 6:
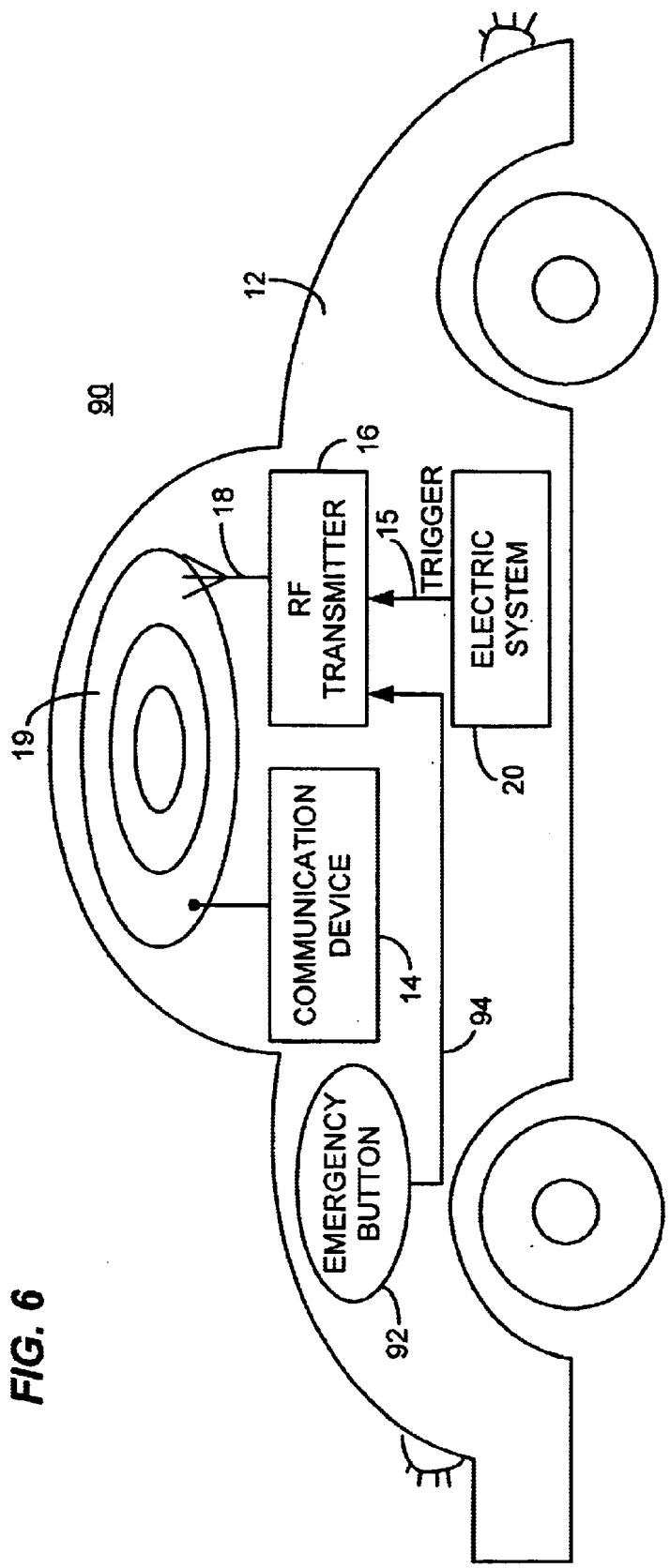
FIG. 6 illustrates the use of an emergency button located in the passenger compartment of a vehicle, according to an aspect of the present invention.

This approach implies that the communication interface is comprised of at least an emergency portion and a non-emergency portion. The emergency portion of the communication interface is pre-programmed with an emergency number, such as the DTMF tones necessary to dial "911" for police, ambulance, or other emergency aid, to enable the user of the communication device to speed-dial this emergency number simply by depressing the emergency key dedicated to this emergency function. The one or more emergency portions of the communication interface are typically programmed upon initial configuration of the communication device, but may be programmed or re-programmed at a later date. If the user has not programmed the emergency portions, the communication device may be powered-down since the speed-dialing feature for the emergency key(s) is not available. The non-emergency portion(s) of the communication interface may be considered to be all other portions of the communication interface that are not dedicated to the emergency function. Typically, the non-emergency portion(s) of the communication interface would be those keys the user would use for manual-dialing or for non-emergency speed dialing. Referring to FIGS. 5B and 6, then, the non-emergency portion of the communication interface could include all keys except for emergency key 70 and emergency button 92, respectively.

An emergency portion of the communication interface may be emergency key 70 located on the communication device itself, such as the cellular telephone "911" emergency key of FIG. 5B, or it may be an emergency button located within the passenger cabin or compartment of the vehicle, such as emergency button 92 located on the dashboard of the passenger cabin of FIG. 6. In the latter case, it is clear that the communication interface includes not only the keypad of the communication device 14 itself but the emergency button 92 located in close proximity to the driver in the passenger compartment. The benefit of emergency button 92 is that the driver or potentially any passenger within vehicle 12 may quickly and easily call for emergency help even when the communication device 14 is not turned off or is not readily accessible. Activating emergency button 92 automatically causes an emergency signal 94 to be generated without further user interaction and sent to RF transmitter 16. In response to receiving emergency signal 94, weak RF signal 18 generated by RF transmitter 16 will cause the communication device to place an emergency call. The user may program emergency button 92 to speed dial the appropriate emergency number or the emergency button may be hard-programmed by the manufacturer of the vehicle, for instance, or the installer of the emergency button 92 upon installing it in the vehicle. The location and manner of presentation of emergency button 92 within environment 12 is critical to facilitate easy access; it should therefore be placed on the dashboard or some other equally accessible location. Emergency button 92 is also preferably sufficiently large and of a bright color, such as red, to allow a user to readily find it in an emergency situation. Moreover, it is recognized that an emergency button analogous to 92 could be placed in a stationary environment as well as the mobile environment illustrated here. For instance, the emergency button could be a panic button inside an emergency room that a doctor or nurse could press if it becomes apparent that a nearby communication device is interfering with medical equipment inside the emergency room.

While the emergency portion of the communication interface shown in FIG. 5B is the "911" emergency key 70, one skilled in the art will recognize that the emergency portion of the communication interface is not limited to a single key of the keypad of a cellular telephone. As described above, the emergency portion may include the emergency button 92 shown in FIG. 6 or the emergency portion of the communication may be differently configured. For instance, the emergency portion of the communication interface may be configured to include one or more speed-dial keys, with each speed-dial key programmed to a different emergency number. In this way, the user could hit a first button to reach the police, a second button to reach an ambulance, etc.

Figure 7:
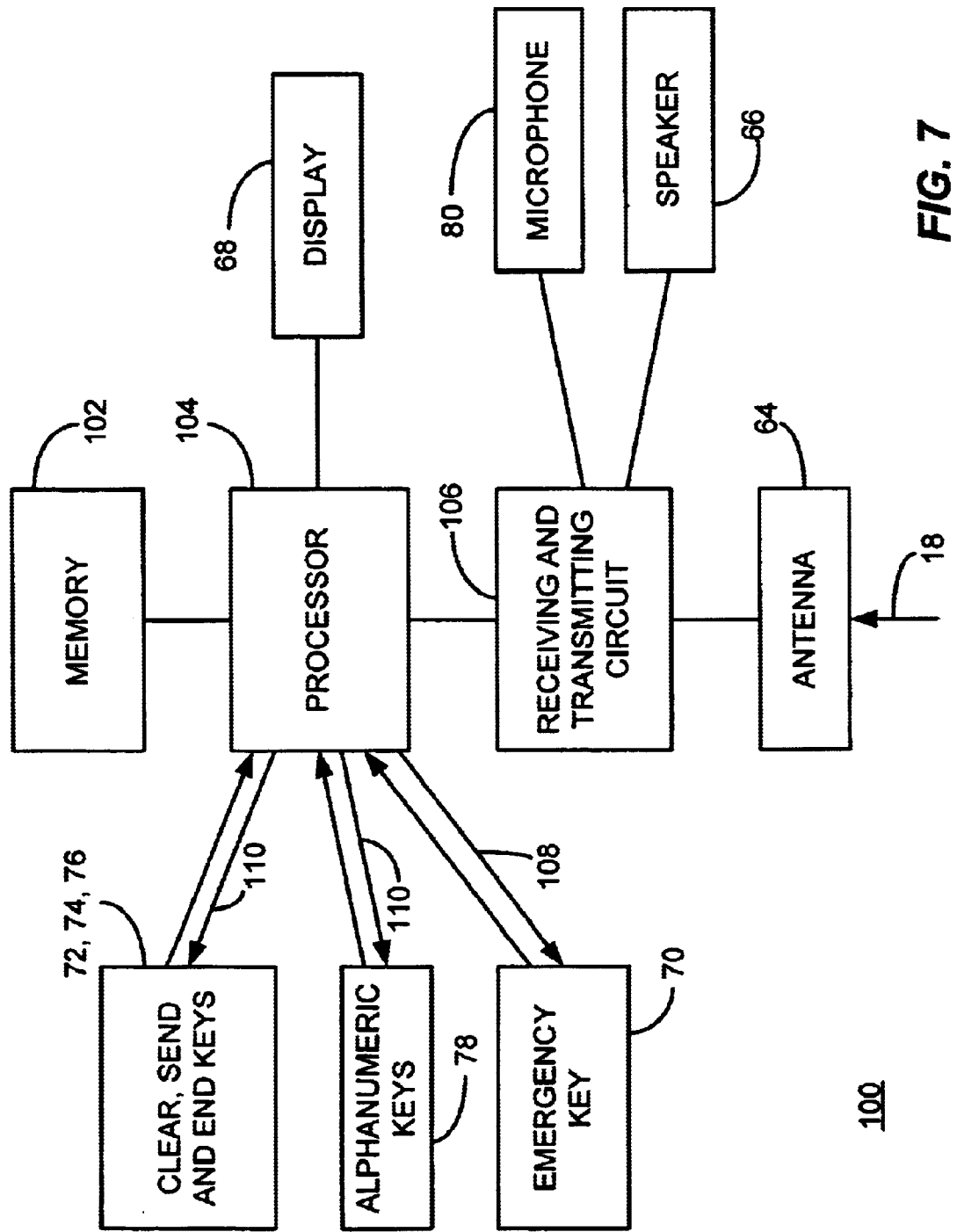
FIG. 7 is a functional block diagram of a cellular telephone, according to the present invention.

As previously mentioned, the communication device is capable of disabling one or more non-emergency portions of the communication interface in response to receiving the weak RF field 19. The workings of a cellular telephone communication device capable of this response will now be described. Referring to FIG. 7, the cellular telephone functional block diagram 100 further includes a memory 102, a processor 104, and a receiving and transmitting circuit 106. The processor 104 is coupled to the keys of the communication interface 70, 72, 74, 76, 78, memory 102, receiving and transmitting circuit 106, and display 68. Processor 104 is adapted to receive signals from receiving and transmitting circuit 106 and/or from the keys when depressed, and to process the received signals in a predetermined manner. Processor 104 may request data from memory 102 during this processing as needed or may store data in memory 102. As a result of this processing, processor 104 may generate and/or supply one or more control and data signals to the appropriate blocks of the diagram to perform desired operations.

Disabling the communication device is accomplished by a control element of the communications device, such as processor 104, that, in response to detecting the weak RF field 19, generates a disable control signal 110 that disables the non-emergency portion(s) of the communication interface. The emergency portion(s) of the communication interface may always be enabled or, in response to receiving the weak RF field 19, the control element may optionally generate an emergency enable signal 108 to enable the emergency portion(s) of the communication interface as shown in FIG. 7. Or in the case of the user depressing emergency button 92 of FIG. 6, the RF signal 18 received by antenna 64 will cause processor 104 to call the programmed emergency number.

Figure 8:
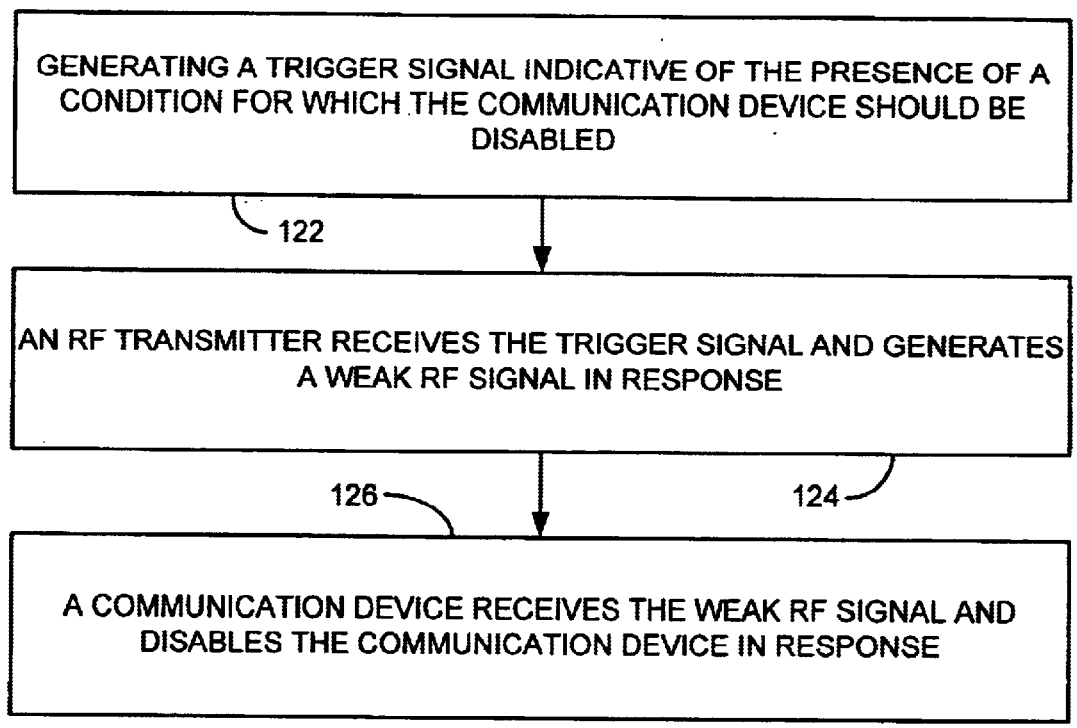
FIG. 8 is an overall flow of the methodology of the present invention.

The methodology of the present invention for selectively disabling a communication device has been described above and now will be further illustrated by way of flowcharts. Referring now to flow 120 of FIG. 8, Block 122 states that first a trigger signal, indicative of the presence of one or more forbidden conditions for which the communication device should be disabled, is generated. A condition for which the communication device should be disabled may be movement of a vehicle, like an automobile, airplane or bus, in which the communication device is located; in this case, the trigger signal is representative of the speed of the vehicle. Excessive noise within the passenger compartment or cabin of the vehicle might be another condition that would cause disablement of the communication device. Or, the condition may linked to a stationary environment 12 itself. For instance, in some environments, such as a hospital, the trigger signal will always be generated since the communication device should always be disabled. Next, at Block 124, an RF transmitter receives the trigger signal and generates a weak RF signal in response to the trigger signal. The RF transmitter may be located in a vehicle, in which case the weak RF signal will be sufficient only to transmit through the relevant portion of a passenger cabin of the vehicle. Blocks 122 and 124 describe the methodology for generating and transmitting a weak RF field capable of disabling a communication device. It is believed that these blocks by themselves identify a unique methodology of the present invention.

Once the weak RF signal is generated in response to the presence of a condition for which a communication device should be disabled, this weak RF field may be received by such a communication device and the communication device may be accordingly disabled, as shown in Block 126. Disabling the communication device would include disabling the communication interface of the communication device, disabling a non-emergency portion of the communication interface of the communication device and enabling an emergency portion of the interface, and powering-down the communication device, all described above. It is believed that the methodology of Block 126 does itself identify a unique methodology of the present invention. In this manner, it is believed that a communication device itself that is capable of performing the methodology of Block 126 would be a unique and useful device.

Figure 9:
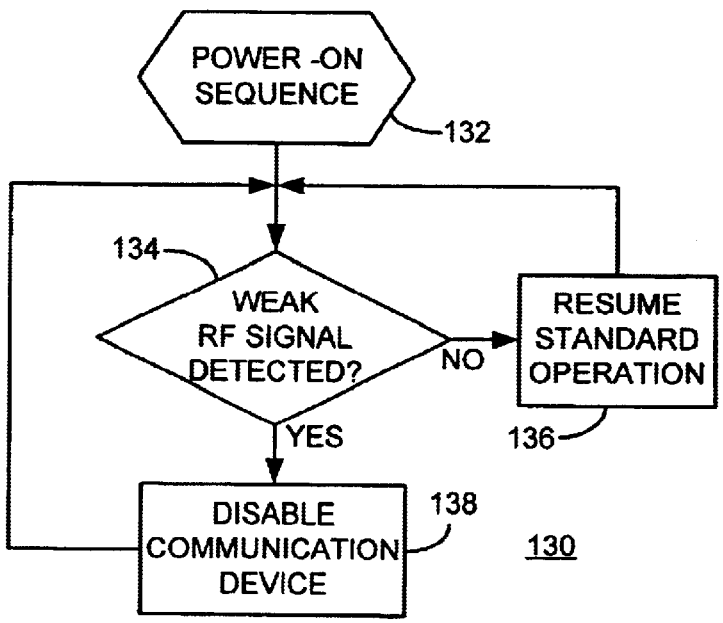
FIG. 9 is a flow of the control function of a cellular telephone, according to the present invention.

The control function of a cellular telephone or other communication device, according to the present invention, is shown in the flow 130 of FIG. 9. First, at Block 132, the communication device is powered-up. Next, at Decision Block 134, the inquiry is whether a weak RF signal/field has been detected. If no, then standard operation of the communication device is resumed at Block 136. If yes, then the communication device is disabled accordingly at Block 138. What is meant at Block 138, "disable communication device," is illustrated in FIGS. 10–13. Referring first to 138' of FIG. 10, the communication device may be disabled by powering it down at Block 140. Or, as shown in 138" of FIG. 11, the non-emergency portion(s) of the communication interface of the device may be disabled at Block 142. Another alternative is shown as 138''' of FIG. 12, in which the non-emergency portion(s) of the communication interface is disabled and the emergency portion(s) is enabled at Block 144. Finally, 138"" of FIG. 13 teaches that at Decision Block 146 the inquiry is whether one or more emergency portion(s) of the communication interface are programmed. If not, the communication device is powered down at Block 148. If yes, then the non-emergency portion of the communication is disabled and the one or more emergency portions of the communication interface are enabled at Block 150.

While the invention has been particularly shown and described with reference to a preferred embodiment, it will be understood by those skilled in the art that various changes in form and detail may be made therein without departing from the spirit and scope of the invention.

What is claimed is:

1. A method of selectively disabling a communication device in an environment, comprising the steps of:

generating a trigger signal indicative of the presence of one or more conditions within the environment for which the communication device is to be disabled;

an RF transmitter within the environment receiving the trigger signal;

the RF transmitter generating a weak RF signal in response to receiving the trigger signal;

the communication device receiving the weak RF signal;

a control element of the communication device disabling the communication device in response to receiving the weak RF signal, wherein disabling the communication device comprises:

determining whether an emergency portion of a communication interface has been programmed;

if the emergency portion has been programmed to automatically dial an emergency number when activated, enabling the emergency portion; and if the emergency portion has not been programmed to automatically dial an emergency number when activated, powering-down the communication device.

2. The method of claim 1, wherein the emergency portion of the communication interface is an emergency key.

3. The method of claim 2, wherein the emergency key is integral to the communication device.

4. The method of claim 2, wherein the emergency key is within the environment but is not integral to the communication device.

5. A method of selectively disabling a communication device in an environment, comprising the steps of:
- the communication device receiving the weak RF signal generated in response to the presence of one or more conditions for which the communication device is to be disabled;
- a control element of the communication device disabling the communication device in response to receiving the weak RF signal, wherein disabling the communication device comprises:
    - determining whether an emergency portion of a communication interface has been programmed;
    - if the emergency portion has been programmed to automatically dial an emergency number when activated, enabling the emergency portion; and
    - if the emergency portion has not been programmed to automatically dial an emergency number when activated, powering-down the communication device.

6. The method of claim 5, wherein the emergency portion is an emergency key.

7. The method of claim 6, wherein the emergency key is integral to the communication device.

8. The method of claim 6, wherein the emergency key is within the environment but is not integral to the communication device.

* * * * *